United States Patent [19]

Moss et al.

[11] 4,169,921

[45] Oct. 2, 1979

[54] POLYISOCYANURATE

[75] Inventors: Ernest K. Moss, St. Petersburg; Alberto DeLeon, Clearwater; Michael J. Skowronski, Largo, all of Fla.

[73] Assignee: The Celotex Corporation, Tampa, Fla.

[21] Appl. No.: 732,046

[22] Filed: Oct. 13, 1976

Related U.S. Application Data

[63] Continuation of Ser. No. 322,842, Jan. 11, 1973, abandoned.

[51] Int. Cl.² ............... C08G 18/14; C08G 18/22; C08G 18/76; B01J 23/04
[52] U.S. Cl. ............... 521/125; 252/431 C; 252/431 N; 521/902
[58] Field of Search ........... 260/2.5 AW, 77.5 NC, 260/2.5 AC; 252/431 C, 431 N; 521/902, 129, 125

[56] References Cited

U.S. PATENT DOCUMENTS

| | | | |
|---|---|---|---|
| 3,516,950 | 6/1970 | Haggis | 260/2.5 AW |
| 3,644,168 | 2/1972 | Bonk | 260/2.5 AW |
| 3,644,232 | 2/1972 | Bernard | 260/2.5 AW |
| 4,129,697 | 12/1978 | Schäpel et al. | 521/129 |

*Primary Examiner*—H. S. Cockeram
*Attorney, Agent, or Firm*—James W. Grace; Charles W. Vanecek

[57] ABSTRACT

An improved polyisocyanurate comprising polymethylene polyphenylisocyanate having a functionality of 2.1 to 3.2 and having an equivalent weight between 120 and 180; a polyol having an equivalent weight between 30 and 100; certain tertiary amino phenols; an alkali metal carboxylate, and a blowing agent.

These compositions exhibit an advantageous cream time, firm time, tack free time, and a low friability.

13 Claims, No Drawings

POLYISOCYANURATE

This is a continuation of application Ser. No. 322,842, filed on Jan. 11, 1973, which is now abandoned.

Compositions of matter which cure to produce polyisocyanurate foams are well-known in the art. However, for many industrial applications, it is necessary that these compositions have a cream time of 12 to 30 and preferably 14 to 17 seconds; a firm time of 25 to 60 and preferably 28 to 35 seconds, and a tack free time of 35 to 70 and preferably 40 to 60 seconds. This is to permit utilization of the composition in commercially available apparatus. Furthermore, the desired cream time, firm time, and tack free time must be achieved without adversely affecting the physical properties of the resultant foam. The physical property most often affected is friability. However, other physical properties such as density, flammability, closed cell percent, compressive strength, flexural strength, and thermal stability can also be adversely affected. When the polyisocyanurate foam is used as a core with facing sheets, the adhesion of the facing sheets to the core can be adversely affected.

Accordingly, it is the object of the present invention to provide an improved composition of matter which is substantially free of one or more of the above disadvantages of prior compositions.

Another object is to provide an improved composition of matter which exhibits a cream time of 14 to 17 seconds, a firm time of 28 to 35 seconds, a tack free time of 40 to 65 seconds, a friability less than 35 percent, and minimum flammability.

A further object of the present invention is to provide an improved composition which has the above-described cream time, firm time, and friability without adversely affecting the other physical properties of the resultant foam.

According to the present invention, there is provided an improved composition of matter comprising: polymethylene polyphenylisocyanate having a functionality of 2.1 to 3.2 and having an equivalent weight between 120 and 180; a polyol preferably a diol having an equivalent weight between 30 and 100; certain tertiary amino phenols, and alkali metal carboxylate, a blowing agent, and a surfactant.

THE POLYMETHYLENE POLYPHENYLISOCYANATE

In the broadest aspect of the present invention, any polymethylene polyphenylisocyanate having the indicated functionality and indicated equivalent weight can be employed. Those polymethylene polyphenylisocyanates having a functionality of less than 2.1 are generally not acceptable because the resultant foams exhibit an undesirably high friability. Polymethylene polyphenylisocyanates having a functionality greater than 3.2 also produce foams of too great a friability. Therefore, the polymethylene polyphenylisocyanates of the present invention generally have a functionality of 2.1 to 3.2 and preferably 2.5 to 3.2.

Polymethylene polyphenylisocyanates having an equivalent weight less than 120 tend to produce foams having too great a friability. Those having an equivalent weight greater than 180 are generally too viscous to make their use practical. Therefore, the polymethylene polyphenylisocyanates employed in the present invention generally have an equivalent weight between 120 and 180 and preferably have an equivalent weight between 130 and 145.

A preferred subclass of polymethylene polyphenylisocyanates especially useful in the present invention are a mixture of those of formula I.

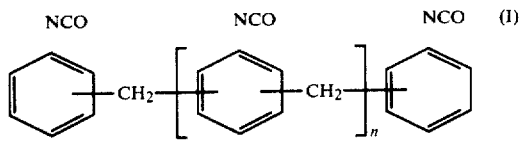

wherein n is an integer from 0 to 8 and wherein the mixture has the above-described functionality and equivalent weight. This mixture should have a viscosity between 100 and 4000 and preferably 250 to 2500 centipoises measured at 25° C. in order to be practical for use in the present invention.

Examples of suitable polymethylene polyphenylisocyanates useful in the present invention include those of Formula I, wherein n is 1 as well as mixtures wherein n can have any value from 0 to 8 as long as the mixture has the specified equivalent weight. One such mixture has 25 to 50 weight % of n=0, 15 to 30 weight % of n=1, 5 to 15 weight % of n=2, and the balance of n=3 to about 8. The synthesis of polymethylene polyphenylisocyanates is described in Seeger et al U.S. Pat. No. 2,683,730 and in Powers U.S. Pat. No. 3,526,652 at Column 3, Lines 6–21. It should, therefore, be understood that the polymethylene polyphenylisocyanate available on the market under the trade names PAPI-20 and MONDUR MRS and E-418 can successfully be employed within the spirit and scope of the present invention. The most preferred polymethylene polyphenyl isocyanates are described in U.S. application Ser. No. 322,843, filed concurrently herewith and now abandoned.

Toluene diisocyanate and diisocyanatophenylmethane both of which are commonly employed in prior art compositions, are unsuitable for use in the present invention. Both of these compounds have a functionality of only 2, which is below the indicated range. Furthermore, toluene diisocyanate has an equivalent weight of less than 120, which is below the desired range for equivalent weight. In the practice of the present invention it is not necessary to exclude all amounts of these two isocyanates as long as the mixture of organic polyisocyanates has a functionality and an equivalent weight within the specified range.

THE POLYOL

In the broadest aspects of the present invention, any polyol having an equivalent weight between 30 and 100, and preferably between 30 and 70 having a functionality between 2 and 3, and having at least two hydroxyl groups which pass the Zerewitinoff Test, can be employed in the present invention. Diols are preferred, although triols and higher polyols can be employed in minor amounts generally less than 10% admixed with diols provided the equivalent weight of the mixture is within the specified range. The preferred diols are those of Formula II:

$$HO-R^1-OH \quad \text{(II)}$$

wherein $R^1$ is selected from the group consisting of lower alkylene and lower alkoxyalkylene with at least two carbon atoms. Examples of suitable diols include, among others, ethylene glycol, propylene glycol; 1,3 propanediol; 1,4-butanediol; diethylene glycol, dipropylene glycol, dimethylol dicyclopentadiene, 1,3-cyclohexanediol; and 1,4-cyclohexanediol.

In order to ensure complete reaction, the polymethylene polyphenylisocyanate and the polyol are generally mixed in an equivalent ratio of 2:1 to 6:1 and preferably 3:1 to 5:1. In ranges outside these proportions the reaction yields a product having undesirable physical characteristics. At higher ratios the product has an undesirably high friability. At lower ratios the product has an undesirably high flammability.

SUITABLE TERTIARY AMINO PHENOLS

The tertiary amino phenols suitable for use in the present invention are those of Formula III:

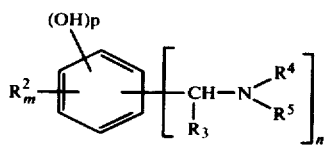

wherein:
$R^2$ is alkyl, aryl, aralkyl, alkaryl, nitro, halogen, hydrogen, or hydroxyl alkyl,
$R^3$ is hydrogen or lower alkyl,
$R^4$ is alkyl, aryl, aralyl or alkaryl,
$R^5$ is alkyl, aryl, aralkyl, or alkaryl,
n is an integer from 1 to 3 inclusive,
m is an integer from 1 to 4 inclusive,
p is 1 or 2,
with the proviso that
the sum of m, n and p is an integer from 1 to 6 inclusive.

The preferred tertiary amino phenols within the scope of Formula II are those of Formula IV:

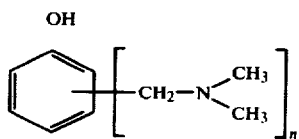

wherein:
n is an integer from 1 to 3 inclusive.
Examples of suitable species of tertiary amino phenols of Formulae III and IV include among others:
2,4,6-tris(dimethylaminomethyl)phenol
2,4,6-tris(diethylaminomethyl)phenol
2,4,6-tris(N-methyl-N-ethylaminomethyl)phenol
2,4-bis(dimethylaminomethyl)phenol
o-dimethylaminomethylphenol The preferred tertiary amine is tris(2,4,6-dimethylaminomethyl) phenol. The tertiary amino phenol generally comprises from 0.01 to 5, and preferably from 0.1 to 2, weight percent of the composition.

ALKALI METAL CARBOXYLATES

In the broadest aspects of the present invention, any alkali metal carboxylate can be employed, however the preferred alkali metal carboxylates are those of Formula V:

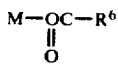

wherein:
M is an alkali metal and $R^6$ is alkyl of 2 to 30 carbon atoms. The preferred alkali metal carboxylates are potassium salts of saturated or unsaturated aliphatic monocarboxylic acids of 2 to 12 carbon atoms, examples of which include among others;
potassium-2-ethylhexoate also known as potassium octoate,
potassium acetate,
potassium decanoate,
potassium butyrate,
potassium isobutyrate,
potassium nonate,
potassium stearate.
Other suitable but less preferred alkali metal carboxylates include among others:
sodium octoate
sodium stearate
sodium caproate
sodium linoleate
cesium oleate
lithium octoate.
The preferred alkali metal carboxylate is potassium-2-ethyl-hexoate.

The tertiary amino phenol and the alkali metal carboxylate are generally present in an equivalent ratio of 0.6:1 to 2.5:1 and preferably 0.9:1 to 1.5:1. The ideal ratio is 1:1. The equivalent weight is the molecular weight divided by the functionality. The functionality of the alkali metal carboxylate is one. The functionality of the tertiary amino phenol is equal to the number of amino nitrogen atoms present and is 1, 2, or 3, i.e., it is equal to n. At higher ratios the cream time is too short, whereas at lower ratios the tack free time tends to be too long. The use of a tertiary amine alone gives too short a cream time and too long a firm time.

According to the present invention, the alkali metal carboxylate is generally present in an equivalent ratio to the polymethylene polyphenyl isocyanate of .002:1 to .02:1 and preferably 0.005:1 to 0.009:1. At lower ratios the firm time tends to be too slow whereas at higher ratios there is an increase in expense without any attendant benefit.

In the instant specification, for the definitions of $R^1$ through $R^6$ inclusive, it will be understood that the preferred alkyl radicals are lower alkyl radicals, examples of which include among others methyl, ethyl, propyl, isobutyl, t-butyl, and isooctyl. The preferred aryl radicals are phenyl and naphthyl. The preferred alkaryl radical is benzyl. The preferred aralkyl radical is phenyl substituted with 1 to 5, and preferably 1 or 2 lower alkyl radicals.

THE BLOWING AGENT

Any blowing agent characteristically employed in similar prior art products can be employed in the composition of the present invention. In general, these blowing agents are liquids having a boiling point between minus 50° C. and plus 100° C. and preferably between 0° C. and 50° C. Examples of suitable blowing agents include, among others, chlorinated and fluorinated hydrocarbons such as $CCl_2F\text{-}CClF_2$, $CCl_2F\text{-}CF_3$ and fluorotrichloromethane which is the preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, weight percent of the composition. When the blowing agent has a boiling point at or below ambient, it is maintained under pressure until mixed with the other components. Alternatively, it can be maintained at subambient temperatures until mixed with the other components. Difluorodichloromethane is the preferred blowing agent having a boiling point outside of the preferred range but within the broad range.

THE SURFACTANT

Successful results have been obtained with silicone-/ethylene-oxide/propylene-oxide copolymers as surfactants. The surfactant molecules act as nucleating points from which bubbles can be initially formed and they further stabilize the bubbles after formation to allow preparation of foam. Among the many surface-active materials mentioned in the patent literature as cell-size control agents and stabilizers for urethane foams are alkoxy silanes, polysilylphosphonates, polydimethyl siloxane and polydimethylsiloxane-polyoxyalkylene block copolymers. For a more detailed explanation of the function of the surfactant in the manufacture of foamed polyurethane and polymethylene polyphenylisocyanate compounds, reference is made to an article entitled "How Silicone Surfactants Affect Polyurethane Foams" in *Modern Plastics*, January, 1967 edition, Pages 133ff, of which Robert J. Boudreau is the author.

Examples of surfactants useful in the present invention include, among others, polydimethylsiloxane-polyoxyalkylene block copolymers available from the Union Carbide Corporation under the tradenames "L-5420" and "L-5340" and from the Dow Corning Corporation under the tradename "DC-193."

The surfactant generally comprises from 0.05 to 4, and preferably comprises from 0.1 to 2, weight percent of the composition.

THE PROCESS

The compositions of the present invention are simply produced by mixing the components with the result that foaming and curing take place. The resultant foam can then be cut and shaped by well-known methods. The mixing can be accomplished at widely varying temperatures, but is generally accomplished at 0 to 50° C., and preferably at 10 to 30° C. The ideal temperature is 15° C. At lower temperatures, the viscosity is too high and the cream time is undesirably long, whereas at higher temperatures, the cream time and firm time are undesirably short. Furthermore, at higher temperatures there is a tendency to lose blowing agent through evaporation and the viscosity is too low.

The components of the composition of the present invention can be mixed in any order. The preferred order is to produce a first component by mixing the polymethylene polyphenylisocyanate with the blowing agent. A second component is simultaneously produced by mixing the polyol and the surfactant. A third component is formed by mixing the tertiary amino phenol and the alkali-metal carboxylate. The first component and the second component are preferably intimately mixed, whereupon the third component is added. It is upon addition of the third component that timing starts to determine the cream time and the firm time. For commercial use a high speed mixing device known in the art can be used. In this device all components are simultaneously metered directly into the device.

EXAMPLES

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the synthesis and properties of a preferred composition of the present invention.

The following quantities of the following ingredients are combined as indicated:

| Item | Name | Quantity grams | gram-equivalent |
|---|---|---|---|
| A | PAPI-20 | 277 | 2.0 |
| B | diethylene glycol | 23 | .43 |
| C | tris (2,4,6-dimethyl-aminomethyl) phenol | 0.84 | .0096 |
| D | potassium-2-ethyl-hexoate | 1.75 | .0096 |
| E | CFCl₃ | 52 | — |
| F | Silicone surfactant Dow Corning "DC-193" | 6 | — |

All ingredients are at 15° C. Items A and E are mixed in a first vessel. Items B and F are mixed in a second vessel. Items C and D are mixed in a third vessel. The contents of the first and second vessels are thoroughly mixed, whereupon the contents of the third vessel are immediately added. Item D is added in the form of a 70 weight % solution in the polyoxyethylene glycol sold by the Union Carbide Corporation under the tradename Carbowax 200. An exothermic reaction ensues, eventually producing a foam. During the reaction the cream time and firm time are determined to be 20 seconds and 40 seconds respectively. The friability of the cured composition is 18%.

In the above example the tri(2,4,6-dimethylaminomethyl) phenol is that supplied by the Rohm & Haas Chemical Company under the tradename DMP-30.

EXAMPLES 2–14

These examples illustrate the optimum results achieved according to the present invention when employing the tertiary amine and the alkali metal carboxylate within the specified ranges.

The following quantities of the following ingredients are combined as indicated:

| Item | Ingredient | Quantity grams | gram-equivalents |
|---|---|---|---|
| A | polymethylene polyphenyl isocyanate | 277 | 2.0 |
| B | diethylene glycol | 23 | .43 |
| C | tris(2,4,6-dimethyl-aminomethyl)phenol | 1.5 | .012 |
| D | potassium-2-ethyl-hexoate | 2.19 | .012 |
| E | CFCl₃ | 52 | — |
| F | silicone surfactant | 6 | — |

| Item | Ingredient | Quantity grams | gram-equivalents |
|---|---|---|---|
| | Dow Corning "DC-193" | 5 | |

All ingredients are at 15° C. Items A and E are mixed in a first vessel. Items B and F are mixed in a second vessel. Items C and D are mixed in a third vessel. The contents of the first and second vessels are thoroughly mixed, whereupon the contents of the third vessel are immediately added. An endothermic reaction ensues. The cream time, firm time, and tack free time are measured and recorded respectively in Columns 5, 6, and 7.

To produce Examples 2 through 14, the above procedure is repeated except that the quantities of Items C and D are the number of gram equivalents listed in Columns 2 and 3 of the table.

Item A is the polymethylene polyphenyl isocyanate within the scope of Formula I sold by the Mobay Chemical Company under the tradename E-418.

Item D is employed in the form of a 70 weight % solution of potassium-2-ethylhexoate in the polyoxyethylene glycol sold by the Union Carbide Corporation under the tradename "Carbowax 200."

Item C is that supplied by the Rohm & Haas Chemical Company under the tradename DMP-30.

TABLE

| Ex. 1 (No.) | Alkali Metal Carboxylate (Item D) 2 (Eq.) | Tertiary Amine (Item C) 3 (Eq.) | Ratio C:D 4 (unitless) | Cream Time 5 (sec.) | Firm Time 6 (sec.) | Tack Free Time 7 (sec.) |
|---|---|---|---|---|---|---|
| 2 | .012 | 0 | 0 | 15 | 35 | 80 |
| 3 | .012 | .006 | .5 | 18 | 39 | 82 |
| 4 | .012 | .011 | .9 | 17 | 36 | 77 |
| 5 | .012 | .012 | 1.0 | 16 | 33 | 61 |
| 6 | .012 | .014 | 1.2 | 16 | 34 | 68 |
| 7 | .012 | .017 | 1.4 | 16 | 33 | 65 |
| 8 | .012 | .023 | 1.8 | 16 | 31 | 60 |
| 9 | .012 | .034 | 2.8 | 13 | 35 | 66 |
| 10 | .012 | .045 | 3.7 | 11 | 32 | 60 |
| 11 | .014 | 0 | 0 | 13 | 32 | 65 |
| 12 | .014 | .006 | .4 | 16 | 36 | 78 |
| 13 | .014 | .011 | .8 | 18 | 37 | 65 |
| 14 | .014 | .014 | 1.0 | 15 | 31 | 60 |
| Preferred Limits | — | — | 0.9–1.5 | 14–17 | 28–35 | 40–65 |

Referring to the above table, it can be seen by comparing Examples 2 and 3 that the addition of the tertiary amine causes a slower reaction, i.e. longer cream and firm times. This is completely unexpected since tertiary amines are known generally to increase the rate of such reactions. This effect is also observed at higher levels of alkali metal carboxylate as shown by a comparison of Examples 11 and 12. Furthermore, by comparison of the data in the table, it can be seen that compositions having the preferred cream, firm, and tack free times are those wherein the ratio of tertiary amine to alkali metal carboxylate and the ratio of alkali metal carboxylate to polymethylene polyphenyl isocyanate are within described limits.

GLOSSARY

CREAM TIME—the time interval beginning with the addition of the catalyst and ending when the composition changes color from dark brown to cream colored. This color change is also accompanied by a simultaneous increase in volume. Unless otherwise indicated, the reactants are mixed at 15° C. under ambient conditions of atmospheric pressure and room temperature (25° C.).

EQUIVALENT WEIGHT—the molecular weight of the component divided by its functionality. For example, ethylene glycol has a molecular weight of 62.07 and has two hydroxyl groups or a functionality of 2. Therefore, the equivalent weight of ethylene glycol is 62.07/2 or approximatelY 31. The equivalent weight of the polymethylene polyphenylisocyanate is of course determined by dividing the average molecular weight by the average number of isocyanate groups present per molecule. These equivalent weights can also be determined empirically.

FIRM TIME—The time interval between catalyst addition and the firm point. Firm time is measured by periodically pressing by hand the top of the rising foam with a tongue depresser (a stick approximately 6"×3/4"×1/16"). When the tongue depresser no longer penetrates the surface, the time is noted. The elasped time from addition of catalyst to this point is termed the firm time. At times prior to the firm point, the composition has the characteristics of a viscous liquid or gel, whereas after the firm point it can be cut and otherwise handled.

BURN EXTENT—this is measured in terms of burn extent in the Monsanto Tunnel, as described by M. M. Levy, *Journal of Cellular Plastics*, April 1967, and by H. L. Vandersall, *Journal of Paint Technology*, 39 494 (1967). Conventional non-flame-retardant urethanes burn in excess of 23 inches (length of tunnel), while moderately flame-retardant conventional foams burn 15–20 inches and highly flame-retardant conventional foams burn 10–15 inches in this tunnel.

FRIABILITY—the propensity of the foam to break expressed in percent weight loss. This is determined by the ASTM C-421 friability test conducted for 10 minutes.

THERMAL STABILITY—the ability of the foam to maintain its weight at elevated temperatures. A temperature of 300° C. is used for all tests. Thermal stability is expressed as percent weight loss and is measured by thermogravimetric analysis according to the technique described by J. E. Sheridan et al in the *Journal of Cellular Plastics*, May-June 1971.

OXYGEN INDEX—this is the measure of the flammability. The higher the number, the less flammable is the product. This is measured according to ASTM D-2863-70 except that a sample measuring ½"×½"×6" is used. A reading of 24 or greater is desired.

TACK FREE TIME—The time interval beginning with addition of the catalyst and ending when a tongue depresser no longer adheres to the surface of the curing foam.

The polyisocyanurate foams of the present invention find utility as structural building panels either alone or laminated with facing sheets such as sheets of aluminum, paper, or combinations thereof. The polyisocyanurate foams of the present invention can be employed as a substitute for hardboard, for asbestos board, and for plasterboard.

Although the invention has been described in considerable detail with reference to certain preferred embodiments thereof, it will be understood that variations and modifications can be effected within the spirit and scope of the invention as described above and as defined in the appended claims.

What is claimed is:

1. A process for producing a polyisocyanurate foam comprising:
I. reacting at 0 to 50° C.:
A. polymethylene polyphenylisocyanate which is a mixture of polymethylene polyphenylisocyanates of Formula I:

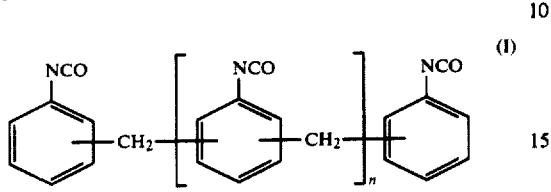

wherein the mixture has:
(a) a functionality of 2.1 to 3.2,
(b) an equivalent weight between 120 and 180, and
(c) a viscosity between 250 and 2500 centipoises, and
(d) n is from 0 to 8, and
B. a polyol having an equivalent weight between 30 and 60, and having Formula II:

wherein $R^1$ is selected from the group consisting of lower alkylene and lower alkoxyalkylene, in the presence of
C. a tertiary amino phenol of Formula III:

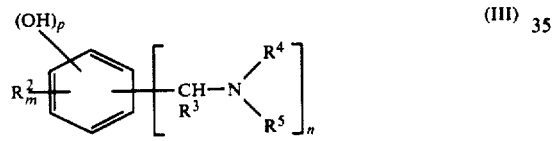

wherein:
$R^2$ is alkyl, aryl, aralkyl, alkaryl, nitro, halogen, hydroxyl, hydrogen or hydroxyl alkyl,
$R^3$ is hydrogen or lower alkyl,
$R^4$ is alkyl, aryl, aralkyl or alkaryl,
$R^5$ is alkyl, aryl, aralkyl, or alkaryl,
n is an integer from 1 to 3 inclusive,
m is an integer from 1 to 4 inclusive,
p is 1 or 2,
with the proviso that
the sum of m, n and p is an integer from 1 to 6 inclusive,
D. a potassium salt of a saturated aliphatic monocarboxylic acid of 2 to 12 carbon atoms,
E. a blowing agent, and
F. a surfactant,
wherein:
the equivalent ratio of A:B is 2:1 to 6:1,
the equivalent ratio of D:A is .002:1 to .02:1,
the equivalent ratio of C:D is .6:1 to 2.5:1,
E comprises 5 to 20 weight % of the composition, and
F comprises 0.1 to 2 weight % of the composition, and then
II. recovering the polyisocyanurate foam.

2. A polyisocyanurate foam comprising the reaction product obtained by reacting:
A. polymethylene polyphenylisocyanate having (1) a functionality of 2.1 to 3.2, and
(2) an equivalent weight between 120 and 180, and
B. a polyol having
(1) a functionality between and 2 and 3, and
(2) an equivalent weight between 30 and 100, in the presence of
C. a tertiary amino phenol of Formula III:

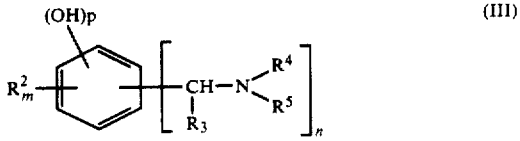

wherein:
$R^2$ is alkyl, aryl, aralkyl, alkaryl, nitro, halogen, hydroxyl, hydrogen or hydroxyl alkyl,
$R^3$ is hydrogen or lower alkyl,
$R^4$ is alkyl, aryl, aralkyl or alkaryl,
$R^5$ is alkyl, aryl, aralkyl, or alkaryl,
n is an integer from 1 to 3 inclusive,
m is an integer from 1 to 4 inclusive,
p is 1 or 2,
with the proviso that
the sum of m, n and p is an integer from 1 to 6 inclusive,
D. an alkali metal carboxylate of Formula V:

wherein M is an alkali metal and $R^6$ is alkyl of 2 to 30 carbon atoms,
E. a blowing agent, and
F. a surfactant,
wherein:
the equivalent ratio of A:B is 2:1 to 6:1,
the equivalent ratio of D:A is 0.002:1 to 0.02:1,
the equivalent ratio of C:D is 0.6:1 to 2.5:1,
E comprises 1 to 30 weight % of the composition, and
F comprises 0.05 to 4 weight % of the composition.

3. A composition of matter of claim 2 wherein the polyol is a diol.

4. A composition of claim 2 wherein the polymethylene polyphenylisocyanate is a mixture of polymethylene polyphenylisocyanates of Formula I:

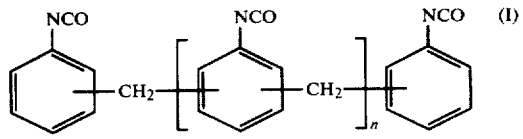

wherein n is an integer from 0 to 8,
wherein the mixture has:
(a) a functionality of 2.1 to 3.2,
(b) an equivalent weight between 120 and 180, and
(c) a viscosity of 250 to 2500 centipoises measured at 25° C.

5. A composition of matter of claim 2 wherein the polyol consists essentially of diethylene glycol.

6. A composition of matter of claim 2 wherein the tertiary amino phenol is one of Formula IV:

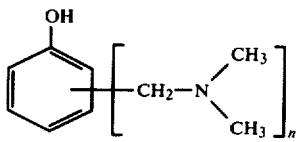

wherein:

n is an integer from 1 to 3 inclusive.

7. A composition of matter of claim 2 wherein the alkali metal carboxylate is a potassium salt of a saturated aliphatic monocarboxylic acid of 2 to 12 carbon atoms.

8. A composition of matter of claim 2 wherein the blowing agent is a liquid having a boiling point between 0° C. and 100° C.

9. A composition of matter of claim 2 wherein the blowing agent is fluorotrichloromethane.

10. A polyisocyanurate foam comprising the reaction product obtained by reacting:

A. polymethylene polyphenylisocyanate which is a mixture of polymethylene polyphenylisocyanates of Formula I:

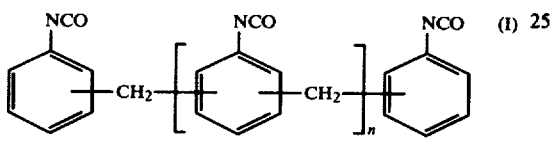

wherein the mixture has:
(a) a functionality of 2.1 to 3.2,
(b) an equivalent weight between 120 and 180, and
(c) a viscosity between 250 and 2500 centipoises, and
(d) n is from 0 to 8, and B a polyol having an equivalent weight between 30 and 60, and having Formula II:

wherein $R^1$ is selected from the group consisting of lower alkylene and lower alkoxyalkylene, in the presence of C. a tertiary amino phenol of Formula IV:

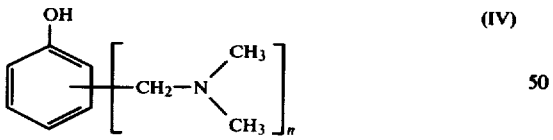

wherein n is an integer from 1 to 3 inclusive,

D. a potassium salt of a saturated aliphatic monocarboxylic acid of 2 to 12 carbon atoms, E. a blowing agent, and F. a surfactant,
wherein:
the equivalent ratio of A:B is 2:1 to 6:1,
the equivalent ratio of D:A is .002:1 to .02:1,
the equivalent ratio of C:D is .6:1 to 2.5:1,
E comprises 5 to 20 weight % of the composition, and
F comprises 0.1 to 2 weight % of the composition.

11. A polyisocyanurate foam comprising the reaction product obtained by reacting:

A. polymethylene polyphenylisocyanate having (1) a functionality of 2.1 to 3.2, and
(2) an equivalent weight between 120 and 180, and B. a polyol having
(1) a functionality between 2 and 3, and
(2) an equivalent weight between 30 and 100,
in the presence of C. a tertiary amino phenol of Formula III:

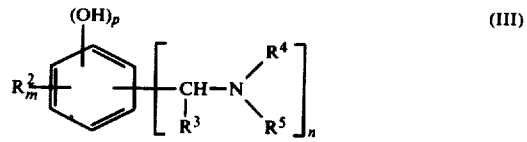

wherein $R^2$ is alkyl, aryl, aralkyl, alkaryl, nitro, halogen, hydroxyl, hydrogen or hydroxyl alkyl, $R^3$ is hydrogen or lower alkyl, $R^4$ is alkyl, aryl, aralkyl, or alkaryl, $R^5$ is alkyl, aryl, aralkyl, or alkaryl, n is an integer from 1 to 3 inclusive, m is an integer from 1 to 4 inclusive, p is 1 or 2, with the proviso that
the sum of m, n and p is an integer from 1 to 6 inclusive, D. an alkali metal carboxylate of Formula V:

wherein M is an alkali metal and $R^6$ is alkyl of 2 to 30 carbon atoms,

E. a blowing agent, and

F. a surfactant,
wherein the equivalent ratio of C:D is 0.6:1 to 2.5:1.

12. A catalytic composition consisting essentially of:

A. an alkali metal carboxylate which is a potassium salt of a saturated aliphatic monocarboxylic acid of 2 to 12 carbon atoms and B. a tertiary amino phenol of Formula III:

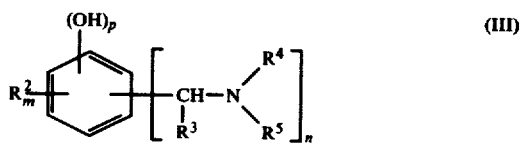

wherein:

$R^2$ is alkyl, aryl, aralkyl, alkaryl, nitro, halogen, hydroxyl, hydrogen or hydroxyl alkyl, $R^3$ is hydrogen or lower alkyl, $R^4$ is alkyl, aryl, aralkyl or alkaryl, $R^5$ is alkyl, aryl, aralkyl, or alkaryl, n is an integer from 1 to 3 inclusive, m is an integer from 1 to 4 inclusive, p is 1 or 2, with the proviso that the sum of m, n and p is an integer from 1 to 6 inclusive, and the equivalent ratio of A:B is 1:0.6 to 1:2.5.

13. A catalytic composition consisting essentially of potassium-2-ethyl hexoate and 2,4,6-tris (dimethylaminomethyl) phenol in an equivalent ratio of 1:.9 to 1:1.5.

* * * * *